(12) United States Patent
Tada et al.

(10) Patent No.: US 6,590,921 B2
(45) Date of Patent: Jul. 8, 2003

(54) NARROW BEAM ARF EXCIMER LASER DEVICE

(75) Inventors: Akifumi Tada, Oyama (JP); Tatushi Igarashi, Oyama (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/761,690

(22) Filed: Jan. 18, 2001

(65) Prior Publication Data

US 2001/0009559 A1 Jul. 26, 2001

(30) Foreign Application Priority Data

Jan. 19, 2000 (JP) ......................................... 2000-009653

(51) Int. Cl.[7] .............................. H01S 3/10; H01S 3/22; H01S 3/08
(52) U.S. Cl. .............................. 372/57; 372/55; 372/20; 372/92; 372/100; 372/102
(58) Field of Search .............................. 372/57, 20, 19, 372/92, 98, 100, 102, 55

(56) References Cited

U.S. PATENT DOCUMENTS 6,028,879 A * 2/2000 Ershov ......................... 372/57

2002/0034209 A1 * 3/2002 Ershov et al. .............. 372/103

* cited by examiner

Primary Examiner—Paul Ip
Assistant Examiner—Armando Rodriguez
(74) Attorney, Agent, or Firm—Nixon Peabody LLP; David S. Safran

(57) ABSTRACT

The invention relates to a semiconductor exposure ArF excimer laser device having a narrow line width containing 95% of the energy of 1.15 pm or less while using an optical system of prior art beam expansion prisms and a diffraction grating. The ArF excimer laser device for narrowing the bandwidth has a line-narrowing optical system formed of an echelle diffraction grating (3) in a Littrow arrangement, a beam expansion prism system composed of at least three prisms arranged on the incident side of the echelle diffraction grating, and slits 4. The blaze angle ($\theta$) of the diffraction grating 3 is 82° or less, the magnification rate M of the beam expansion prism system is 26 times or less, the oscillation pulse width $T_{is}$ is 60 ns or less, the length L of the resonator is in a range of 1000 to 1350 mm and the slit width W is 1.0 mm or more, satisfying relation $(W+11) \cos \theta / (LMT_{is}^{0.853}) < 4.94 \times 10^{-6}$.

3 Claims, 3 Drawing Sheets

NARROW BEAM ARF EXCIMER LASER DEVICE

BACKGROUND OF THE INVENTION

1. Field of the Invention

This invention relates to an ArF excimer laser device, and more particularly an ArF excimer laser device having a narrow spectral line width for exposing a semiconductor.

2. Description of the Related Art

With semiconductor integrated circuits becoming more and more fine and highly integrated it has become necessary to improve the resolution capacity of a projection exposure device. Accordingly, it has been aimed at obtaining exposure light having a short wavelength to be radiated from the light source for the exposure, and an ArF excimer laser device has become important as a light source for exposure of next generation semiconductors.

In the ArF excimer laser device, laser gas acting as the laser medium is excited by generating an electrical discharge within a laser chamber in which, as the laser gas, a gas mixture composed of fluorine ($F_2$) gas, argon (Ar) gas and rare gases such as neon (Ne) gas acting as a buffer gas is contained at several 100 kPa.

In addition, since the spectral line width of the laser beam emitted from the ArF excimer laser device is wide (about 400 pm) it has become necessary to narrow the spectral line width as much as possible in order to avoid the problem of aberration in the projection optical system of the exposure device. In the prior art, this narrow spectral line width is obtained by a method wherein an optical system for narrowing the line width which is composed of a beam expansion prism system and a diffraction grating, for example, is installed within the laser resonator.

When, under these circumstances, the ArF excimer laser device is installed in an ArF scanner-type stepper device for use in the exposure of semiconductors, the requirement of narrowing the line width is even more severe as a high NA (numerical aperture) of the exposure device is realized to increase the resolution. In the case that NA is 0.6 or more it is normally required to attain an oscillation wavelength having a half width (full width at half maximum) of 0.5 pm or less. Further, more importantly, it becomes necessary to have a width containing 95% of the energy (95% of the integrated line width) of 1.15 pm. Further, in the case that NA is 0.7 or more, it is required to have a super-narrow band with a half width of 0.35 pm and a width containing 95% of the energy of 0.85 pm or less.

As described above, in the prior art methods for narrowing the line width a laser beam is expanded through a prism system and the laser beam is processed in a spectroscopic manner through an echelle diffraction grating. However, such a method as above does not satisfy the aforesaid requirement. In addition, although it has also been proposed to provide the method for using a narrow bandwidth in combination with an element for forming a narrow bandwidth as an etalon or the like, there remain the problems that the lifetime of the element for narrowing the line width such as an etalon or the like is short and its control is quite difficult.

SUMMARY OF THE INVENTION

The present invention has been made with reference to the problems of the prior art as described above, and it is the object of the invention to devise conditions for obtaining a spectral bandwidth containing 95% of the energy (integrated width beam by 95%) as narrow as 1.15 pm or less when using an optical system for narrowing the line width comprised of a prior art beam expansion prism system and a diffraction grating and to devise an ArF excimer laser device having a narrow bandwidth for use in semiconductor exposure.

The ArF excimer laser device for narrowing the bandwidth of the present invention solving the aforesaid object has a line-narrowing optical system comprised of an echelle diffraction grating of the Littrow arrangement, a beam expansion prism system composed of three prisms arranged at the incident side of the echelle diffraction grating, and slits, and the blaze angle θ of the echelle diffraction grating is 82 or less, the magnification rate M of the beam expansion prism system is 26 times or less, the oscillation pulse width $T_{is}$ is 60 ns or less, the length L of the resonator is in a range of 1000 to 1350 mm and the slit width W is 1.0 mm or more, wherein:

$$(W+11) \cos \theta/(LMT_{is}^{0.853}) < 4.94 \times 10^{-6} \quad (14)$$

Another ArF excimer laser device for narrowing the bandwidth of the present invention has an optical system for narrowing the bandwidth comprised of an echelle diffraction grating having a Littrow arrangement, a beam expansion prism system composed of three prisms arranged at the incident side of the echelle diffraction grating, and slits, and the blaze angle θ of the echelle diffraction grating is 82° or less, the magnification rate M of the beam expansion prisms is 26 times or less, the oscillation pulse width $T_{is}$ is 60 ns or less, the length L of the resonator is in a range of 1000 to 1350 mm, and the slit width W is 1.0 mm or more, wherein:

$$(W+11) \cos \theta/(LMT_{is}^{0.853}) < 3.65 \times 10^{-6} \quad (15)$$

Also in these cases, it is possible to set the repetition rate to more than 3 kHz.

In the present invention, where either the equation (14) or the equation (15) is satisfied, an ArF excimer laser device having either a 95% integrated line width of 1.15 pm or 0.85 pm can be realized, which has been assumed to be quite difficult up to now, and its output can be used in connection with an optical system for narrowing the bandwidth comprised of a prior art beam expansion prism system and a diffraction grating.

DETAILED DESCRIPTION OF THE INVENTION

Figure 1:
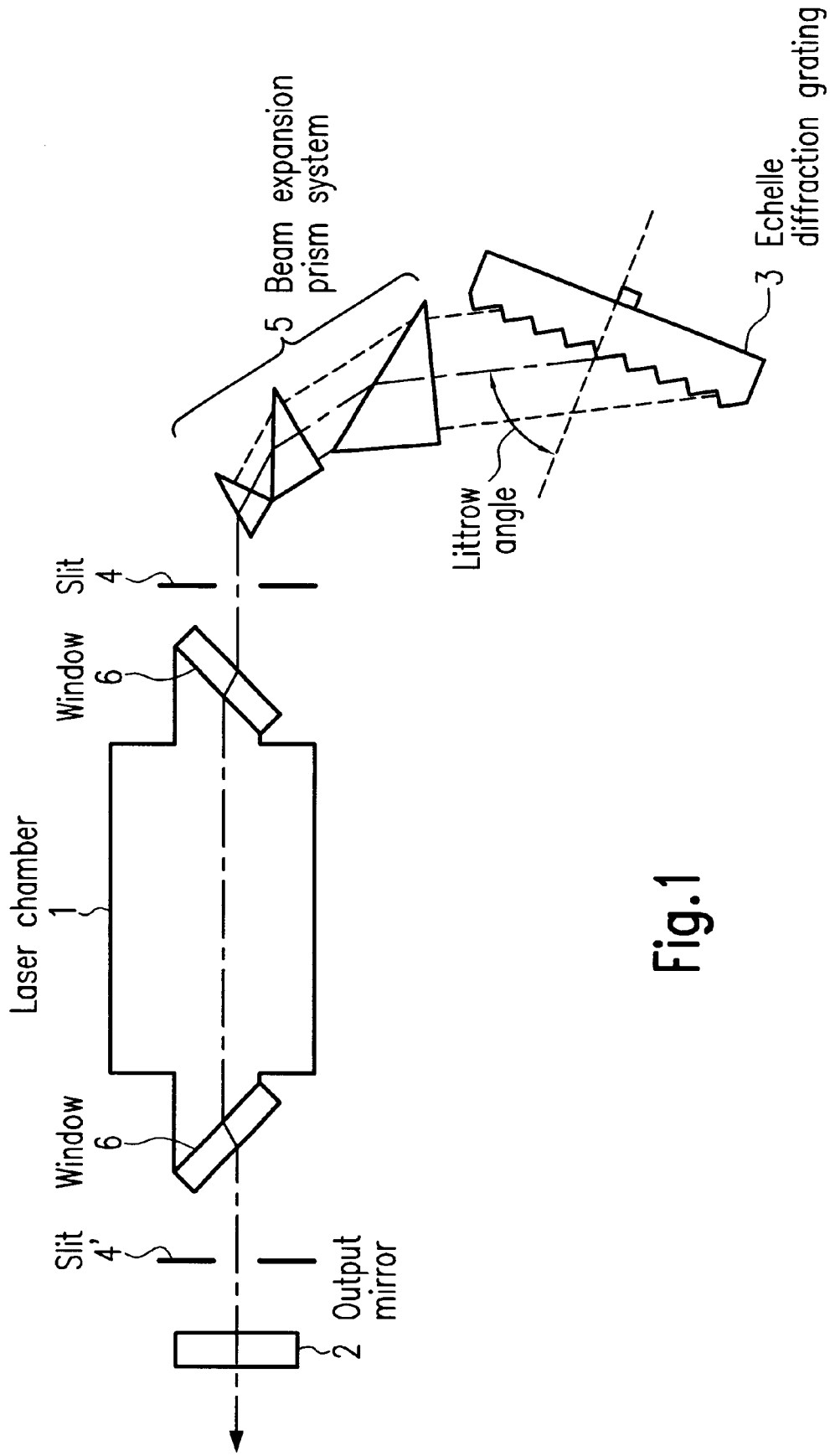
FIG. 1 is a schematic showing the optical configuration of a narrow bandwidth ArF excimer laser device of the present invention.

Referring now to the drawings, the principle of the narrow bandwidth ArF excimer laser device of the present invention and a practical example of the narrow bandwidth ArF excimer laser device of a preferred optical configuration based on the said principle will be explained in more detail.

First, an ArF excimer laser device using a narrow bandwidth optical system composed of a beam expansion prism system 5 and an echelle diffraction grating 3 having a Littrow arrangement as shown in FIG. 1 will be described. The activating system and the control system and the like are not illustrated in FIG. 1. A laser chamber 1 is filled with buffer gas other than argon gas and fluorine gas acting as the laser medium. Additionally, a main electrical discharge electrode for activation, a preionization electrode and a gas circulation system are stored in the laser chamber 1. This laser chamber 1 is arranged in an optical resonator comprised of an output mirror 2 and an echelle diffraction grating 3 having a Littrow arrangement. Between the echelle diffraction grating 3 and the laser chamber 1 there are arranged a beam expansion prism system 5 composed of 3 or more prisms and a slit 4. The diffraction grating 3, the beam expansion prism system 5 and the slit 4 constitute the narrow bandwidth optical system. A window 6 is arranged in the optical path of the laser chamber 1, and another slit 4' is arranged between the laser chamber 1 and the output mirror 2.

In this case, the echelle diffraction grating 3 having a Littrow arrangement is installed in a slant state versus the incident light, and the slant angle and the diffraction angle with a predetermined diffraction degree become equal to each other. In this arrangement, the angle formed by a line vertical to the surface of the diffraction grating 3 and the incident optical axis is called a Littrow angle. The plane of each of the grooves formed on the incident side of the grating is called a blaze plane, and the angle formed by the vertical line of the blaze plane and another vertical line extending from the surface of the diffraction grating 3 is called a blaze angle. The diffraction grating 3 is constituted such that the incident light is incident perpendicular to the blaze plane resulting in that the Littrow angle and the blaze angle do normally coincide with each other.

Now, the line width and the output or the like of each of the variables of an ArF excimer laser device having a configuration as above will be studied, and their applicable range will also be studied.

First, as indicated in the following description, an equation for narrowing the bandwidth of the ArF excimer laser device will be introduced using the technical concepts of a diffraction grating and a spectroscope.

The resolution of the echelle diffraction grating 3 having a Littrow arrangement is assumed to be as follows.

The resolution R can be expressed as:

$$R = \lambda/\Delta\lambda = mN \quad (1)$$

(for example, "DIFFRACTION GRATING HANDBOOK" Second edition, pp 1–11, 1993, MILTON ROY CO.), where $\lambda$ is the main oscillation wavelength, m is the diffraction degree and N is the total number of diffraction grating grooves for diffraction. Assuming that the beam plane expanded by the beam expansion prism system 5 and the beam plane being incident on the diffraction grating 3 is $W_g$, the number of diffraction grating grooves per unit length is $N_g$, the width where the beam having a line width $W_g$ is incident on the diffraction grating 3 is A, and the blaze angle (=Littrow angle) is $\theta$, the equation (1) can be expressed as:

$$R = \lambda/\Delta\lambda = mN = mAN_g = mW_g N_g/\cos\theta \quad (2)$$

By applying this equation, equations (3) and (4) can be obtained.

$$\Delta\lambda = \lambda/(mW_g N_g)\cos\theta \quad (3)$$

$$\alpha \cos\theta/(mW_g N_g) \quad (4)$$

where the diffraction can be expressed as $$m\lambda = 2d\sin\theta = 2\sin\theta/N_g \quad (5)$$

(d is a grating constant) so that, when a wavelength is defined, the value of $N_g m$ is kept constant resulting in that equation (6) can be expressed as:

$$\Delta\lambda\alpha \cos\theta/W_g \quad (6)$$

In this case, when the magnification rate of the beam expansion prism system 5 is defined as M and the width of the slit 4 is defined as W, with a relation of $W_g = MW$, a relation of $$\Delta\lambda\alpha \cos\theta/(MW) \quad (7)$$

is obtained. This equation (7) is a theoretical one where it has not yet been studied whether or not the equation (7) is satisfied when the 95% energy line width at a wavelength of the ArF excimer laser of 193 nm is 2 pm or less.

In this case, we will follow the assumption that the laser of the optical system shown in FIG. 1 is a spectroscope, and terms of the slit W and the length L of the resonator will be added to the above equation (7). Since it is possible to assume that $\Delta\lambda$ is proportional to W and inverse proportional to the length of the resonator (the focal length) L, the following equation $$\lambda\alpha W\cos\theta/(LMW) = \cos\theta/(LM) \quad (8)$$

can be expected.

However, it has become apparent that although the line width $\Delta\lambda$ is substantially inverse proportional to the length L of the resonator, as can expected with reference to the results of experiments (4), (5) described later, the slit width W has a certain relation to the line width $\Delta\lambda$, and the narrower the slit width the slightly narrower the line width $\Delta\lambda$. The result can be expressed by the following equation.

$$\Delta\lambda\alpha(W+11)\cos\theta/(LM) \quad (9)$$

where the unit of the values L and W is in mm.

The relation between the line width $\Delta\lambda$ and the pulse width $T_{is}$ will now be studied. In this case, the pulse width $T_{is}$ shall be defined by the following equation. Provided that P(t) is the laser intensity dependent on the time "t":

$$T_{is} = [\int P(t)dt]^2/\int P^2(t)dt \quad (10)$$

If this pulse width $T_{is}$ is extended the number of round trips (the times of resonation of the laser beam in the optical resonator) is increased and the number of times in which the laser beam passes through the narrow bandwidth optical system is increased. The relation between the line width $\Delta\lambda$ and the pulse width $T_{is}$ was already studied in the prior art with a short pulse width $T_{is}$ of 30 ns or less ("Performance characteristics of ultra-narrow ArF laser for DUV lithography" PROCEEDING OF SPIE (1999)). In accordance with this prior art, it has been reported that the half width is inverse proportional to a multiplication by 0.5 of the number of round trips. However, the situation in which the pulse width $T_{is}$ is 30 ns or more has not yet been studied.

Regarding this feature, the present inventors have found that, when the pulse width $T_{is}$ is 30 ns or more, the line width $\Delta\lambda$ is inverse proportional to a multiplication by 0.853 of the pulse width $T_{is}$. When this result is added to the equation (9) the following equation (11) is attained:

$$\Delta\lambda \alpha (W+11) \cos \theta / (LMT_{is}^{0.853}) \qquad (11)$$

Finally, a proportional constant (k) in the above equation (11) has been calculated with reference to the result of experiment (6) to be described later. The inventors have calculated a value of $k=2.33\times10^5$.

That is, $$\Delta\lambda = 2.33\times10^5 (W+11) \cos \theta / (LMT_{is}^{0.853}) \qquad (12)$$

is the relative equation found by the present inventors with reference to the line width $\Delta\lambda$, the expansion rate M of the beam expansion prism system 5, the width W of the slit 4, the length L of the resonator and the pulse width $T_{is}$ of the ArF excimer laser device having the configuration shown in FIG. 1.

Experimental Results (1) Blaze Angle of a Diffraction Grating

Figure 2:
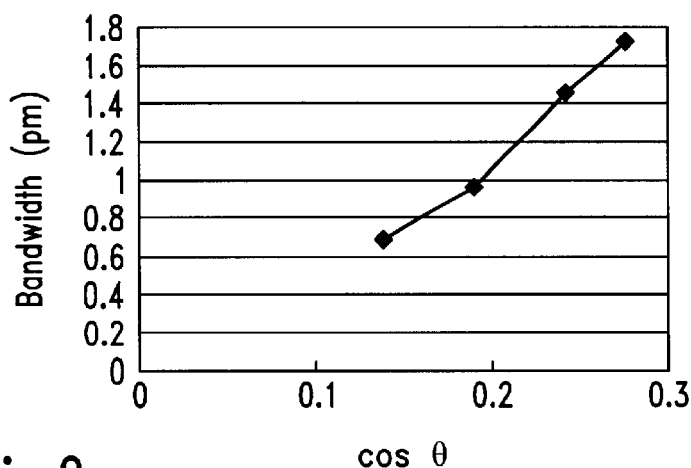
FIG. 2 is a view showing experimental results indicating that the line width varies when the value of cos θ is changed in the configuration of FIG. 1.

As shown in FIG. 1, an echelle diffraction grating 3 having a Littrow arrangement with a high resolution is used as a reflection-type diffraction grating applied in an optical system for narrowing the bandwidth. The line width in the echelle diffraction grating is narrowed when the blaze angle $\theta$ is increased. FIG. 2 is a view showing experimental results with respect to the variation of the line width when the value of $\cos \theta$ is change. It has been found that $\Delta\lambda$ is proportional to $\cos \theta$.

The output of the ArF excimer laser device is not defined by the blaze angle $\theta$ but by the state of the corrugated surface. When the blaze angle is large it is not easy to keep the corrugated surface in a satisfactory state. The present inventor has studied the blaze angle $\theta$ in detail and has found that at present the blaze angle (the Littrow angle) $\theta$ should be 82° or less due to the limitations in manufacturing process.

(2) Prism Enlargement Rate

Figure 3:
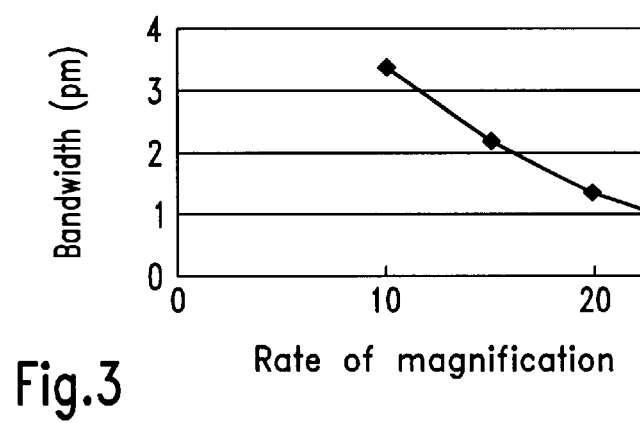
FIG. 3 is a view illustrating experimental results of the relation between the magnification rate of the beam expansion prism system and the line width in the configuration of FIG. 1.

With the arrangement as shown in FIG. 1, it has been found that the magnification rate of the beam expansion prism system 5 and the line width are substantially inverse proportional to each other as indicated by the experimental results shown in FIG. 3.

Figure 4:
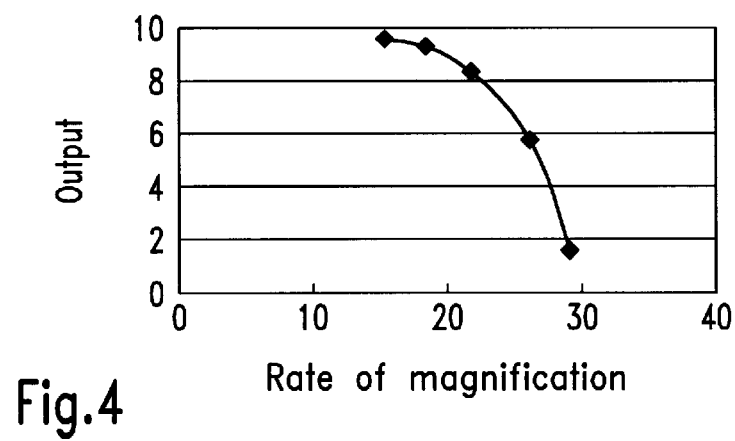
FIG. 4 is a view of experimental results of the relation between the magnification rate of the beam expansion prism system and the output in the configuration of FIG. 1.

In addition, it has been found that the output is dependent on an increased transmittance of a non-reflecting coating of each of the prisms that compose the beam expansion prism system 5 and an increased length of the resonator caused by an increased magnification rate of the beam expansion prism system 5 (FIG. 4). Additionally, the angle of incidence of the prism may also influence the output. As a result of the studies it has been found that, since the transmittance for the prism is substantially constant up to an angle of incidence of 73° for the prism, its output is kept constant. However, when the angle of incidence is 73° or more, the output is decreased due to a decreased transmittance, and if the angle of incidence is 75° or more the output is substantially decreased. More practically, the magnification rate at an angle of incidence of 75° is 26, and this is a rather limited value.

(3) Pulse Width

Figure 5:
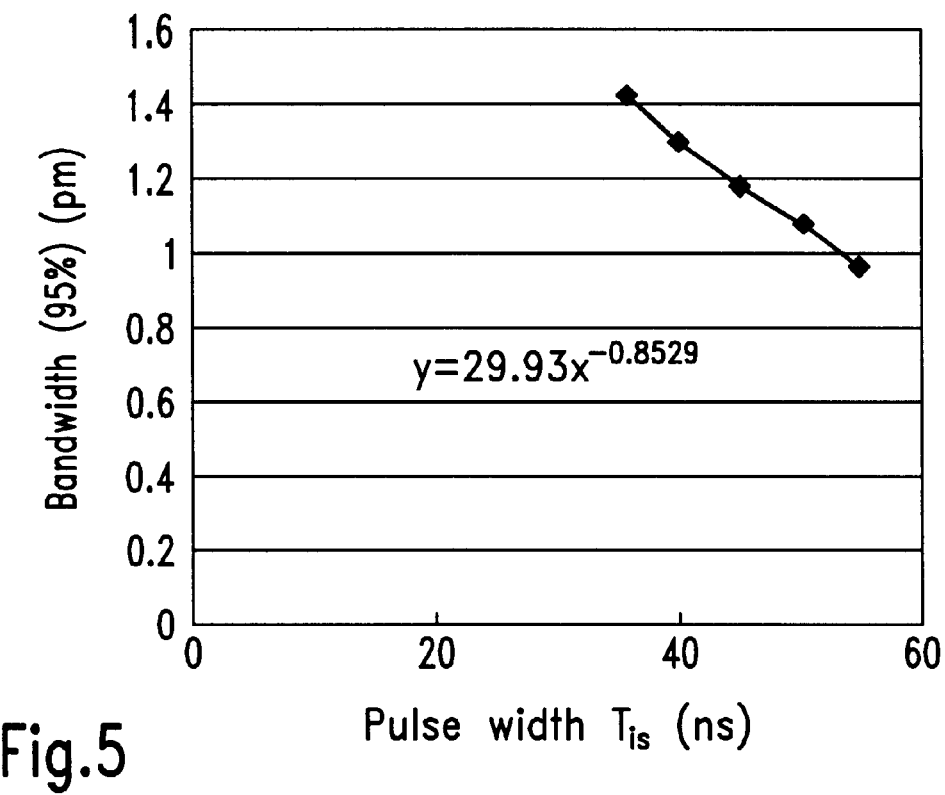
FIG. 5 is a view illustrating experimental results of the relation between the pulse width $T_{is}$ and the line width in the configuration shown in FIG. 1.

In an arrangement as shown in FIG. 1, it has been found that a relation between the pulse width $T_{is}$ and the line width can be attained as shown in FIG. 5., and the line width is inverse proportional to the pulse width $T_{is}$ multiplied by 0.853.

In addition, the output was not decreased until $T_{is}=57$ ns and the pulse width $T_{is}$ could be extended. It has been found that, in a range in which $T_{is}$ is 60 ns or more, a rapid reduction of the output occurs so that the time range of 60 ns or more is of limited use.

(4) Resonator Length

It has been found that in the arrangement shown in FIG. 1, in the relation between the line width and the length of the resonator, the line width is inverse proportional to the length of the resonator within a range of 1000 to 1350 mm.

In addition, the output is apt to be substantially decreased if an electrical discharge length is kept constant and the length of the resonator is extended, and if the electrical discharge length is elongated the output is increased. However, the length of the resonator is limited to 1350 mm due to the fact that a mounting area for the semiconductor exposure laser is restricted.

(5) Slit Width

Figure 6:
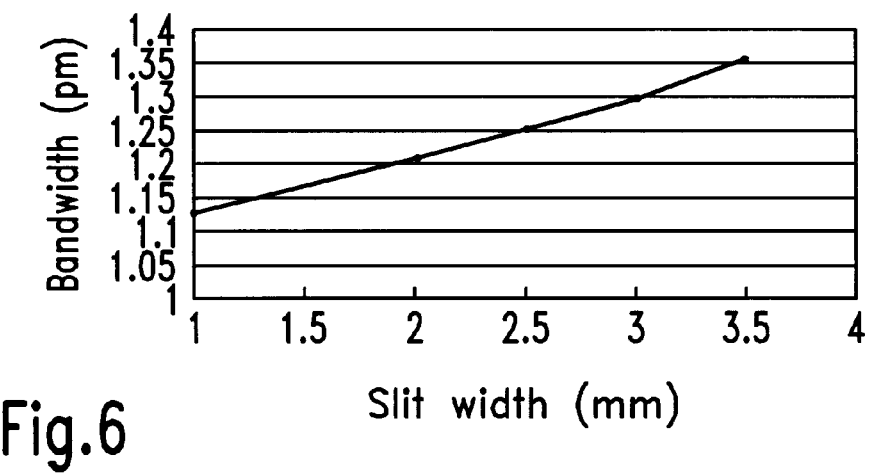
FIG. 6 is a view of experimental results of the relation between the slit width and the line width in the configuration shown in FIG. 1.

In the case of the arrangement shown in FIG. 1, it has been found as a result of experiments that the slit width is proportional to (W+11) as shown in FIG. 6 within a range of 1.0 to 3.5 mm.

Further, although the output is inverse proportional to the slit width W, it has been found that there is a limit to this value at 1.0 mm.

(6) Proportional Constant k

When the proportional constant k is added to the above equation (11)

$$\Delta\lambda \alpha (W+11) \cos \theta / (LMT_{is}^{0.853}) \qquad (11)$$

the following equation (13) results.

$$\Delta\lambda = k(W+11) \cos \theta / (LMT_{is}^{0.853}) \qquad (13)$$

In this case, $\Delta\lambda$ and $T_{is}$ have been calculated for four different cases with W, L, M and $\theta$ being changed as indicated below. W, L, M and $\theta$ have been used in the equation (13) to calculate the constant k. The values of k are substantially coincident with each other, and their mean value is $k=2.33\times10^5$.

TABLE-1

| $\Delta\lambda$ | $T_{is}$ | M | W | L | $\cos\theta$ | $k \times 10^{-5}$ |
|---|---|---|---|---|---|---|
| 1.95 | 33 | 18.3 | 2 | 1040 | 0.243 | 2.32 |
| 1.82 | 33 | 18.3 | 2 | 1120 | 0.243 | 2.33 |
| 0.87 | 50 | 18.3 | 1.7 | 1260 | 0.191 | 2.33 |
| 0.84 | 55 | 21.7 | 2 | 1040 | 0.191 | 2.33 |

It is necessary that the blaze angle $\theta$ of the echelle diffraction grating 3 is 82 or less with respect to the results of experiment (1) above, the prism magnification rate M of the beam expansion prism system 5 is 26 times or less with regard to the result of experiment (2) above, the pulse width $T_{is}$ is 60 ns or less with regard to the result of experiment (3) above, the length L of the resonator is in the range of 1000 to 1350 mm with respect to the result of experiment (4) above, and the slit width W is 1.0 mm or more with regard to the result of experiment (5) above, and the further calculation based on equation (12) requires that, in order to attain a line width (95% or more) $\Delta\lambda$: 1.15 pm, the ArF excimer laser device should be constituted to satisfy the following relation.

$$(W+11) \cos \theta/(LMT_{is}^{0.853}) < 4.94 \times 10^{-6} \quad (14)$$

Table-2 below shows some calculation examples satisfying or not satisfying the equation (14) (the first four examples satisfy the equation and the remaining two examples do not satisfy the equation). In Table-2, a relation of $(W+11) \cos \theta/(LMT_{is}^{0.853})=C$ is applied.

TABLE 2

| Δλ pm | k × 10⁻⁵ | C × 10⁶ | θ(°) | W mm | Prism incident angle (°) | M | L mm | $T_{is}$ ns |
|---|---|---|---|---|---|---|---|---|
| 1.10 | 2.33 | 4.71 | 79 | 2 | 73 | 18.3 | 1120 | 45 |
| 1.00 | 2.33 | 4.31 | 79 | 2 | 73 | 18.3 | 1120 | 50 |
| 1.03 | 2.33 | 4.42 | 76 | 1.8 | 74 | 21.6 | 1260 | 45 |
| 1.03 | 2.33 | 4.43 | 80 | 2 | 73 | 18.3 | 1200 | 40 |
| 1.21 | 2.33 | 5.21 | 79 | 2 | 73 | 18.3 | 1120 | 40 |
| 1.17 | 2.33 | 5.03 | 79 | 2 | 72 | 15.7 | 1120 | 50 |

As described above, the present inventors found conditions under which a 95% integrated line width of 1.15 pm and a sufficient output can be realized with a prior art prism grating system (which has always been assumed to be quite difficult up to now in the art)

Further, in order to attain the line width (95% or more) Δλ: 0.85 pm, it is satisfactory to constitute the ArF excimer laser device to satisfy the following relation.

$$(W+11) \cos \theta/(LMT_{is}^{0.853}) < 3.65 \times 10^{-6} \quad (15)$$

Similarly, in following Table-3 there are indicated some calculation examples satisfying or not satisfying the equation (15)(the first four examples do satisfy the equation but the remaining four examples do not). In Table-3, the relation is $(W+11) \cos \theta/(LMT_{is}^{0.853})=C$.

TABLE 3

| Δλ (pm) | k × 10⁻⁵ | C × 10⁶ (pm) | θ(°) | W (mm) | Prism angle of incidence (°) | M | L (mm) | $T_{is}$ (ns) |
|---|---|---|---|---|---|---|---|---|
| 0.83 | 2.33 | 3.56 | 79 | 2 | 73 | 18.34 | 1250 | 55 |
| 0.80 | 2.33 | 3.44 | 82 | 2 | 73 | 18.34 | 1120 | 45 |
| 0.68 | 2.33 | 2.92 | 82 | 2 | 74 | 21.66 | 1120 | 45 |
| 0.62 | 2.33 | 2.68 | 82 | 1.8 | 74 | 21.66 | 1200 | 45 |
| 0.93 | 2.33 | 3.97 | 79 | 2 | 73 | 18.34 | 1120 | 55 |
| 0.93 | 2.33 | 3.99 | 79 | 2 | 74 | 21.66 | 1120 | 45 |
| 1.36 | 2.33 | 5.84 | 79 | 2 | 73 | 18.34 | 1120 | 35 |
| 1.17 | 2.33 | 5.03 | 79 | 2 | 73 | 18.34 | 1300 | 35 |

As described above, the present inventors found conditions under which an ArF excimer laser device with a 95% integrated line width of 0.85 pm and output thereof can be realized while using a prior art prism grating system.

In the case that the line width is set to be 1.15 pm or less, it is not easy to realize an oscillation pulse width $T_{is}$ of the ArF excimer laser device of 30 ns or more and a repetition rate of 3 kHz or more. As already proposed by the present applicant in Japanese Patent Application No. Hei 11-261628, it is satisfactory to is carry out the laser oscillating operation in a start half period of the electrical discharge oscillating current waveform of a pulse with reversed polarity and in at least one half period subsequent to the former period. In addition, as already proposed by the present applicant in Japanese Patent Application No. Hei 11-362688, it is satisfactory if a primary current feeds energy from a magnetic pulse compression circuit to the electrical discharge electrodes via a peaking capacitor and a secondary current feeds energy from a capacitor in final stage of the magnetic pulse compression circuit to the electrical discharge electrodes for charging the peaking capacitor overlap with each other, the oscillation cycle of the secondary current is set to be longer than that of the primary current and a pulse of laser operation is carried out in a start half period of the electrical discharge oscillating current waveform where the polarity of the primary current having the secondary current are overlapped and in at least two half periods subsequent to the former period.

Although the narrow bandwidth ArF excimer laser device of the present invention has been described in principle and with reference to some practical examples of numerical values the present invention is not limited to these practical examples but various kinds of modifications can be realized.

What is claimed is:

1. An ArF excimer laser device with a line-narrowing optical system comprising an echelle diffraction grating in a Littrow arrangement, a beam expansion prism system composed of at least three prisms arranged on the incident side of the echelle diffraction grating, and a slit wherein a blaze angle θ of the echelle diffraction grating is 82° or less, a magnification rate M of the beam is 26 times or less, an oscillation pulse width $T_{is}$ is 60 ns or less, a resonator length L is in a range of 1000 to 1350 mm and a slit width W is 1.0 mm or more, satisfying the relation $$(W+11) \cos \theta/(LMT_{is}^{0.853}) < 4.94 \times 10^{-6}$$

for obtaining a 95% integrated line width of 1.15 pm or less without an etalon based coupler.

2. An ArF excimer laser device with a line-narrowing optical system comprising an echelle diffraction grating in a Littrow arrangement a beam expansion prism system composed of at least three prisuts arranged on the incident side of the echelle diffraction grating, and a slit, wherein a blaze angle θ of the echelle diffraction grating is 82° or less, a magnification rate M of the beam expansion prism system is 26 times or less, an oscillation pulse width $T_{is}$ is 60 ns or less, a resonator length L is in a range of 1000 to 1350 nm and a slit width W is 1.0 mm or more, satisfying the relation $$(W+11) \cos \theta/(LMT_{is}^{0.853}) < 3.65 \times 10^{-6}$$

for obtaining a 95% integrated line width of 0.85 pm or less, without an etalon based coupler.

3. An ArF excimer laser device according to claim 1 or claim 2, wherein the repetition rate is 3 kHz or more.

* * * * *